United States Patent
Lehnberger et al.

(10) Patent No.: US 12,338,499 B2
(45) Date of Patent: Jun. 24, 2025

(54) COOLING CRYSTALLIZER AND SUGAR CRYSTALLIZATION METHOD

(71) Applicant: BMA BRAUNSCHWEIGISCHE MASCHINENBAUANSTALT AG, Braunschweig (DE)

(72) Inventors: Andreas Lehnberger, Braunschweig (DE); Jörg Schmidt, Salem (DE); Folker Aljets, Salzgitter (DE)

(73) Assignee: BMA BRAUNSCHWEIGISCHE MASCHINENBAUANSTALT AG, Braunschweig (DE)

( * ) Notice: Subject to any disclaimer, the term of this patent is extended or adjusted under 35 U.S.C. 154(b) by 607 days.

(21) Appl. No.: 17/637,015

(22) PCT Filed: Aug. 24, 2020

(86) PCT No.: PCT/EP2020/073602
§ 371 (c)(1),
(2) Date: Feb. 21, 2022

(87) PCT Pub. No.: WO2021/043608
PCT Pub. Date: Mar. 11, 2021

(65) Prior Publication Data
US 2022/0290263 A1 Sep. 15, 2022
US 2023/0093770 A2 Mar. 23, 2023

(30) Foreign Application Priority Data

Sep. 5, 2019 (DE) ..................... 10 2019 123 903.6

(51) Int. Cl.
*C13B 30/02* (2011.01)
*B01D 9/00* (2006.01)

(52) U.S. Cl.
CPC ............ *C13B 30/02* (2013.01); *B01D 9/0013* (2013.01); *B01D 9/0063* (2013.01); *C13B 30/022* (2013.01)

(58) Field of Classification Search
CPC ....... C13B 30/02; C13B 30/022; C13B 30/00; B01D 9/0013; B01D 9/0063; C13K 1/10
See application file for complete search history.

(56) References Cited

U.S. PATENT DOCUMENTS 4,194,557 A * 3/1980 Madsen ................ C13B 30/022
127/15
4,202,859 A 5/1980 Madsen
(Continued)

FOREIGN PATENT DOCUMENTS

CA 997671 A 9/1976
CN 101077140 A 11/2007
(Continued)

OTHER PUBLICATIONS

Use of a Fiber-Optic Turbidity Probe to Monitor and Control Commercial-Scale Unseeded Batch Crystallizations, Richard S. Harner, Roberta J. Ressler, Roger L. Briggs, James E. Hitt, Paul A. Larsen, and Timothy C. Frank, 2009, Organic Process Research & Development, 13, 114-124 (Year: 2009).*
(Continued)

*Primary Examiner* — Daniel C. McCracken
*Assistant Examiner* — Joshua Maxwell Speer
(74) *Attorney, Agent, or Firm* — WCF IP

(57) ABSTRACT

The invention relates to a cooling crystallizer (2.0) for saccharose magma in a vertically oriented container (2.1) which has an upper inlet (2.2) for supplying magma and a lower outlet (2.3) for discharging magma, comprising multiple cooling blocks (5.0) which are mutually spaced in a vertical direction. A heat carrier fluid flows through the
(Continued)

Figure 1:
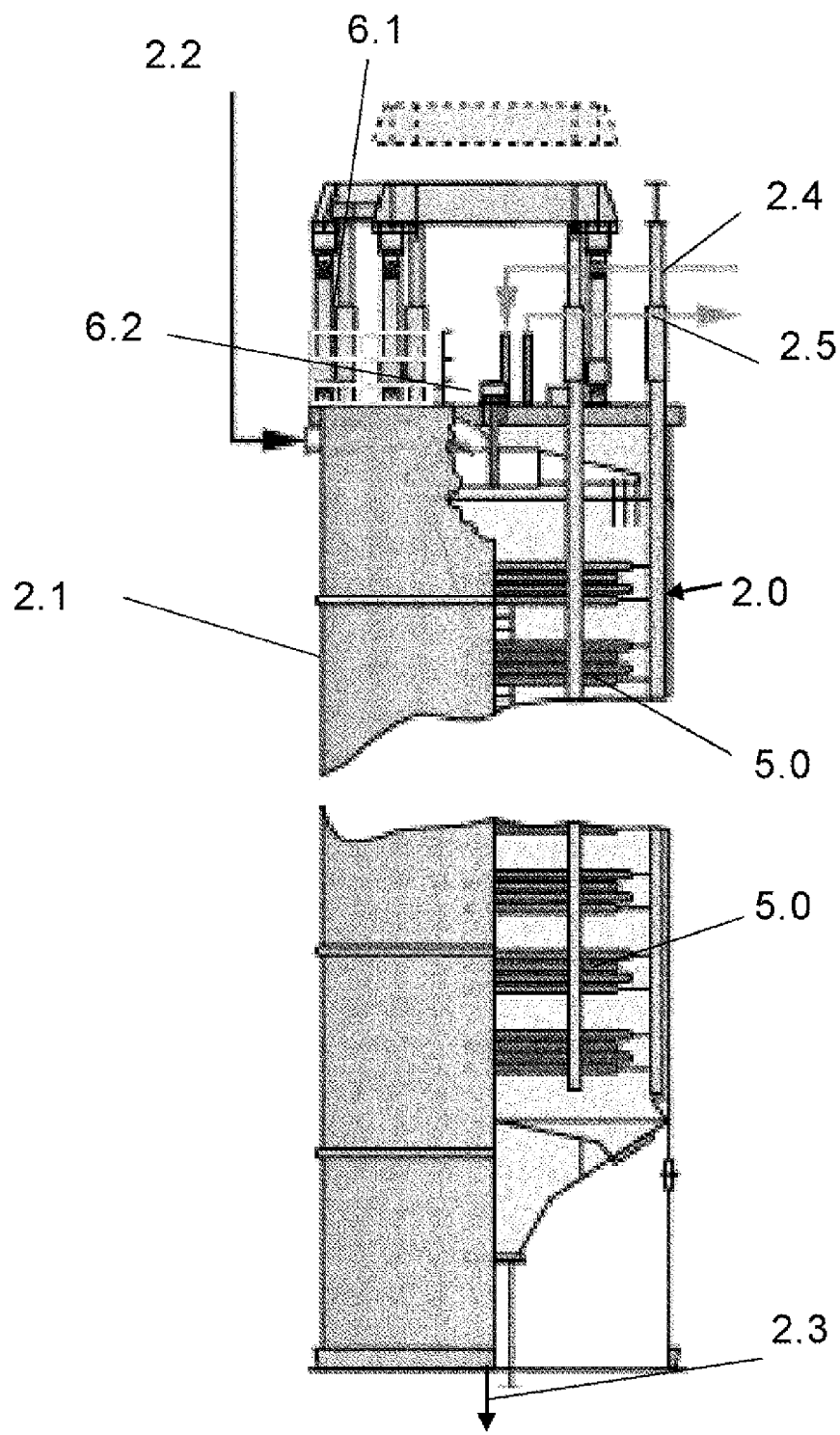

cooling blocks (5.0), and the cooling blocks are coupled to a heat exchanger in order to dissipate heat from the magma, wherein multiple cooling blocks (5.0) are combined to form a cooling packet (5.1; 5.2), and the cooling packets (5.1; 5.2) are designed as separate cooling circuits with separate heat exchangers (2.1.2; 2.2.2).

15 Claims, 5 Drawing Sheets

(56) References Cited

U.S. PATENT DOCUMENTS

| | | |
|---|---|---|
| 2010/0275907 A1 | 11/2010 | Mantelatto |
| 2014/0000586 A1 | 1/2014 | Mantelatto |

FOREIGN PATENT DOCUMENTS

| | | | |
|---|---|---|---|
| CN | 101896241 A | 11/2010 | |
| CN | 202482331 U | 10/2012 | |
| DE | 2743671 A1 | 3/1978 | |
| DE | 3839182 A1 | 5/1990 | |
| SU | 1280012 A1 | 12/1986 | |
| UA | 87223 C2 | 6/2009 | |
| WO | WO-2009049391 A1 * | 4/2009 | ........... B01D 9/0013 |

OTHER PUBLICATIONS

Modeling and Simulation of Vertical Continuous Cooling Crystallizers for the Sugar Industry, Mario Llano-Restrepo, 2005, Ind. Eng. Chem. Res., 44, 9244-9263 (Year: 2005).*
Recent Developments in Vertical Crystalliser Design, Getaz M and Sanders R, 2011, Proc S Afr Sug Technol Ass 84: 472-484 (Year: 2011).*
Maria Llano-Restrepo, "Modeling and Simulation of Vertical Continuous Cooling Crystallizers for the Sugar Industry", Ind. Eng. Chem. Res. 44, 2005.
Michael Getaz et al, "Recent development s in vert ical cooling cryst alliser design", Nov. 1, 2011 (Nov. 1, 2011), p. 1-8, Retrieved from the Internet: URL:https://dk8mx37zdr9bp.cloudfront.net/sugar-bio-energy/Recent%20developments%20in%20vertical%20cooling%20crystalliser%20design-Published%20in%20the%20Sugar%20Industriy%20-%20November%202011.pdf.
Mario Llano-Restrepo, "Modeling and Simulation of Vertical Continuous Cooling Crystallizers for the Sugar Industry", Industrial & Engineering Chemistry Research, vol. 44, No. 24, Nov. 1, 2005 (Nov. 1, 2005), p. 9244-9263.

* cited by examiner

COOLING CRYSTALLIZER AND SUGAR CRYSTALLIZATION METHOD

The invention relates to a cooling crystallizer for sucrose magma in a vertically oriented container, which has an inlet at the top for feeding in magma and an outlet at the bottom for discharging magma, having a plurality of cooling blocks which are vertically spaced apart from one another, wherein a heat transfer fluid flows through the cooling blocks and the cooling blocks are coupled with a heat exchanger in order to dissipate heat from the magma. The invention relates also to a method for sugar crystallization and cooling sugar magma in a cooling crystallizer.

The crystallization of the sugar is an important process step for obtaining the sucrose dissolved in syrup. During a crystallization step, the technically achievable desugarization of a solution is limited by the crystal content in the magma. Multiple crystallization steps are therefore required. Excellent separation of the sugar from the non-sugars can be achieved by the physical operation of crystallization. A condition thereof is a well-controlled crystallization process, in which a crystallizate with a low aggregate content and few fine crystals is produced. For a very long time, evaporative crystallization of the sugar has been carried out almost exclusively in discontinuously operating apparatuses. The use of mechanical stirrers in such discontinuously operating evaporative crystallizers brought improvements in terms of both the sugar quality and the reduction of the energy use in the crystallization. In the meantime, continuously operating evaporative crystallizers have become conventional, in order to ensure uniform magma production.

After the evaporative crystallization, in which a major portion of the sugar crystal mass is produced, the magma is cooled. The aim is to remove as much sucrose as possible from the mother liquor by further crystallizing the crystals that are already present. This is the last desugarization stage in sugar production. Errors in process control during cooling have irreversible effects on the amount of sugar lost to the molasses, so that the cooling crystallization is of great importance. After cooling, the mother solution is separated from the crystals in a centrifuge. It must thereby be ensured that the crystals do not fall below a specific size, since they will otherwise pass through the centrifuge screen with the mother solution and be lost as sugar crystal; the sugar yield would be reduced as a result. Therefore, it is an aim during cooling that no new crystals are formed but that crystal formation takes place only on crystals that are already present. The formation of new crystals is prevented in that specific supersaturations are not exceeded. It must further be ensured in the sugar crystallization that the supersaturation in the mother solution is reduced by continued crystal growth, which ultimately prevents further crystallization. The supersaturation can be increased to the desired level again only by lowering the temperature of the magma.

In principle, cooling of the magma can take place in open containers without insulation or in containers with built-in cooling pipes or cooling surfaces.

GB 2053019A discloses a heat exchanger for crystallization of suspension, in which a plurality of cooling elements which are vertically spaced apart from one another and through which a heat exchanging fluid is pumped are arranged in a cylindrical body. The cooling elements are lifted and lowered via two hydraulic pistons.

DE 35 17 511 C2 relates to a cooling crystallization tower for sugar magma having a vertical, cylindrical container with an inlet at the top and an outlet at the bottom and stage floors with a downwardly tapering cone shape which divide the container into chambers. A cylinder which forms a closable through-opening with the stage floor is arranged in each chamber. In addition, a heat exchanger, through which a cooling medium flows, and circulating elements which are capable of oscillating in the vertical direction are arranged in each chamber.

U.S. Pat. No. 8,475,597 B2 relates to a process and equipment for sugar crystallization by controlled cooling of saturated sugar solution in a crystallizer having a cylindrical housing at the top of which there is formed an inlet for a saturated sugar solution and at the bottom of which there is formed an outlet for a crystallized mass. Inside the housing, a plurality of heat exchangers are arranged at different levels transversely to the longitudinal extent of the housing. Each heat exchanger defines in the interior of the housing a respective crystallization stage of the mass, which is moved through the housing from top to bottom. The heat exchangers are in the form of a spiral or a coil and are each provided with a connection for hot water or cooling water. The heat exchange medium is guided from an outlet into the heat exchanger located directly above it to the uppermost heat exchanger, from which the heat exchange medium is discharged for processing. Each heat exchanger, with the exception of the uppermost and lowermost heat exchanger, has an inlet which is coupled with an external heat exchanger, so that the temperature of the magma in each crystallization stage is maintained within a predetermined range. To this end, temperature sensors are provided on the inside of the housing and are coupled with an electronic control module which opens or closes valves in dependence on the respective temperature signal in order to adjust the flow rates and temperatures of the heat exchange medium. The heat transfer fluid can be colder or warmer than the heat exchange medium situated in the region of the valve.

Furthermore, the publication "technik-programm" from Braunschweigischen Maschinenbauanstalt AG discloses a cooling crystallizer which consists of standardized cooling block elements in which the cooling medium is forcibly guided inside pipelines from bottom to top through a vertical cooling cylinder. Inside the cylinder, magma is moved from top to bottom by means of gravity. The cooling block elements oscillate in the vertical direction, wherein the cooling block elements are arranged in two circuits, so that either only one cooling block circuit or both cooling block circuits can be operated. Should a cooling block circuit fail, the cooling crystallizer can continue to operate. The two circuits are hydraulically connected in series.

A cooling block of one cooling block circuit is arranged in each case between two cooling blocks of the other cooling block circuit, the top and bottom cooling blocks forming an exception.

The object of the present invention is to provide a cooling crystallizer and a method for sugar crystallization with which an improved yield of sugar crystals from a magma can be achieved with as little outlay as possible in terms of apparatus.

According to the invention, this object is achieved by a device having the features of the main claim and by a method having the features of the further independent claim. Advantageous embodiments and further developments of the invention are disclosed in the dependent claims, the description and the figures.

The cooling crystallizer for sucrose magma having a vertically oriented container, which has an inlet at the top for feeding in magma and an outlet at the bottom for discharging magma, having a plurality of cooling blocks which are vertically spaced apart from one another, wherein a heat transfer fluid flows through the cooling blocks and the cooling blocks are coupled with a heat exchanger in order to dissipate heat from the magma, provides that a plurality of cooling blocks are combined to form a cooling pack and the cooling packs are configured as separate cooling circuits with separate heat exchangers. With the configuration of the cooling crystallizer with a plurality of cooling packs comprising a plurality of cooling blocks and the thermal and hydraulic separation thereof, it is possible to adjust both different cooling water amounts and different temperature differences between the magma and the heat exchangers, or the respective heat transfer medium. It is thus possible in some regions to adjust the temperature to the respective degree of saturation in the magma and the degree of desugarization of the mother solution. By means of the hydraulic decoupling it is possible optimally to adjust the required amount of heat transfer fluid, for example water, so that it is possible to achieve optimal crystallization conditions at all times during the cooling process. It is thus possible to achieve a higher magma throughput with the same apparatus size or a smaller apparatus size with a given throughput. Even with higher throughputs, the pressure loss in the line for the heat transfer fluid is no longer a limiting criterion.

As well as the possibility of adjusting the throughputs as a result of the thermal decoupling, the thermal decoupling with the separate heat exchangers also allows the cooling packs to be supplied with heat transfer fluid of different temperatures, so that the temperature differences over the length of contact of the magma with the respective cooling pack can optimally be adapted to the respective degree of saturation of the magma.

A further development provides that the cooling packs are configured so as to be vertically separate from one another and are arranged inside the container, so that, as a result of the spatial separation and vertical spacing, an adapted temperature difference can be adjusted over the transport path of the magma within the container.

The temperature difference between the magma and the respective cooling pack is preferably adjusted so that it decreases from top to bottom. The greatest temperature difference between the magma and the respective cooling block, or the heat transfer fluid, is thus present in the uppermost cooling pack, and the smallest temperature difference is correspondingly present in the lowermost cooling pack. Account is thus taken of the different degrees of saturation and the velocities of crystallization, which differ in dependence on the temperatures. A slow cooling rate can thus be adjusted in the case where crystal growth is already advanced at low magma temperatures.

The flow rate of the heat transfer fluid flowing through the cooling packs is advantageously adjustable, wherein the required flow rate of the heat transfer fluid can be adjusted in dependence on sensor data or on state variables. It is thus possible to control or regulate the sugar crystallization within the cooling crystallizer. The inlet temperature of the heat transfer fluid into the respective cooling pack is likewise advantageously configured so that it can be adjusted separately from the inlet temperature into the other cooling packs. Since the maximum possible crystal growth velocity decreases as the purity of the magma falls, it is advantageous if the temperature difference decreases from top to bottom over the path through the container and thus at a low magma temperature a small temperature difference relative to the heat transfer fluid is also present. At the end of the cooling, the temperature difference between the heat transfer fluid and the magma should, where possible, be adjusted such that the supersaturation within the mother solution permits the maximum possible crystal growth velocity.

The cooling blocks and thus also the cooling packs can be arranged in the container so as to be vertically displaceable and can be coupled with a drive, so that the cooling blocks and cooling packs, driven jointly or individually, are movable in the container. To this end, the cooling packs can be connected to lifting pipes which, driven via hydraulic cylinders, travel a predefined distance in the vertical direction. In the lifting pipes, the cooling water is guided into the respective cooling packs or cooling blocks to the cooling pipes and discharged again. As a result of the vertical movement and movability of the cooling blocks and cooling packs within the magma, an improved temperature distribution and uniform cooling within the magma are first achieved. In addition, as a result of the movement of the cooling packs within the magma, a cleaning effect is achieved at the cooling blocks, so that sugar crystals do not adhere to, or are removed from, the cooling pipes of the cooling packs or cooling blocks. As a result of a solely vertical movability of the cooling packs, a relative movement is produced between the cooling packs and the magma, but the magma is mixed only slightly. As a result of the oscillating vertical movement, large temperature fluctuations in the magma and thus the formation of fine crystals are prevented. However, a continuous temperature reduction continues to be ensured with the vertical movability.

In addition to the thermal and hydraulic separation of the cooling packs from one another, it is advantageous if a temperature sensor for the magma is arranged in the region between two cooling packs and/or two cooling blocks, in order to obtain information about the crystallization process via the temperature of the magma. The throughput speeds of the magma, the flow rates of the heat transfer fluid and the respective temperatures can be changed on the basis of the sensor data, in order to achieve an optimum sugar yield. It is advantageous to arrange a temperature sensor in particular at the transition between two cooling packs, in order to adjust the corresponding parameters in some regions. Combining the cooling blocks to form cooling packs facilitates the adaptation of the parameters to the respective progress of the crystallization, without unduly increasing the complexity of the system.

A further development of the invention provides that at least one optical sensor is arranged in the container and/or in a pipeline for detecting crystal formation. The sensor data of the optical sensor can be used, alone or together with other sensor data, for example the data of the temperature sensor or temperature sensors, to control or regulate the sugar crystallization within the cooling crystallizer. This can take place, for example, by changing the flow rates of magma and/or heat transfer fluid, changing the temperatures or by other changes to operating parameters, according to whether it is determined that new sugar crystals have formed or not. If, for example, new crystals that have undesirably formed are detected in the crystallizer by means of an optical sensor, these can be dissolved again in a downstream mixer, for example by the addition of hot medium, such as, for example, hot molasses. In addition, other parameters can be adjusted in order to prevent the formation of new crystals.

The cooling crystallizer with two cooling circuits is configured in particular for processing sucrose magma, but it is also possible in principle to process fructose or glucose magma using such a cooling crystallizer. In particular when a sensor for detecting crystal formation, for example an optical sensor, is fitted, control and/or regulation of the crystallization process is facilitated.

The method for sugar crystallization and cooling of sugar magma in a cooling crystallizer as described above provides that a decreasing temperature difference between the cooling blocks and the magma is adjusted in the direction of flow of the magma from top to bottom. The temperature difference is advantageously adjusted individually for each cooling pack, wherein the temperature difference should be the greatest in the uppermost cooling pack and the smallest in the lowermost cooling pack. The driving temperature difference at the start of cooling of the magma is preferably the greatest in the region of the upper cooling pack, since the mother liquor is present there with the greatest purity and a high crystal growth velocity is thus possible. At the end of the cooling crystallization, the mother liquor has comparatively low purity, so that slow cooling and a small temperature difference are advantageous in terms of the process. The method is applicable in particular to sucrose magma but can also be used for glucose or fructose magma.

For example, the temperature difference between the heat transfer fluid and the magma at the uppermost cooling pack can be between 15 K and 20 K, while the temperature difference in a cooling pack arranged vertically beneath is between 8 K and 12 K.

Different supersaturations of the magma can be adjusted in each region of the cooling packs, which can be effected by temperature control and adjusting the flow velocity of the magma through the container. The flow velocity of the magma can be varied, for example, by opening or closing a passage, a slide or a valve at the outlet at the bottom.

In order to make the cooling uniform, the heat transfer fluid is advantageously guided countercurrently through the cooling blocks, so that a uniform temperature difference over the length of the cooling pack can be achieved from the inlet to the outlet from the respective cooling blocks and cooling packs. It is thus possible, for example, that the temperature difference between the magma and the cooling blocks in a cooling pack is kept constant.

In a further embodiment, the above-described temperature difference between the magma and the cooling blocks in a cooling pack can vary or be variably adjusted and can decrease, for example, over the retention time of the magma in the cooling crystallizer. As a result, the supersaturation of the magma can be more uniformly adjusted, for example, and the crystal growth can be increased.

Figure 2:
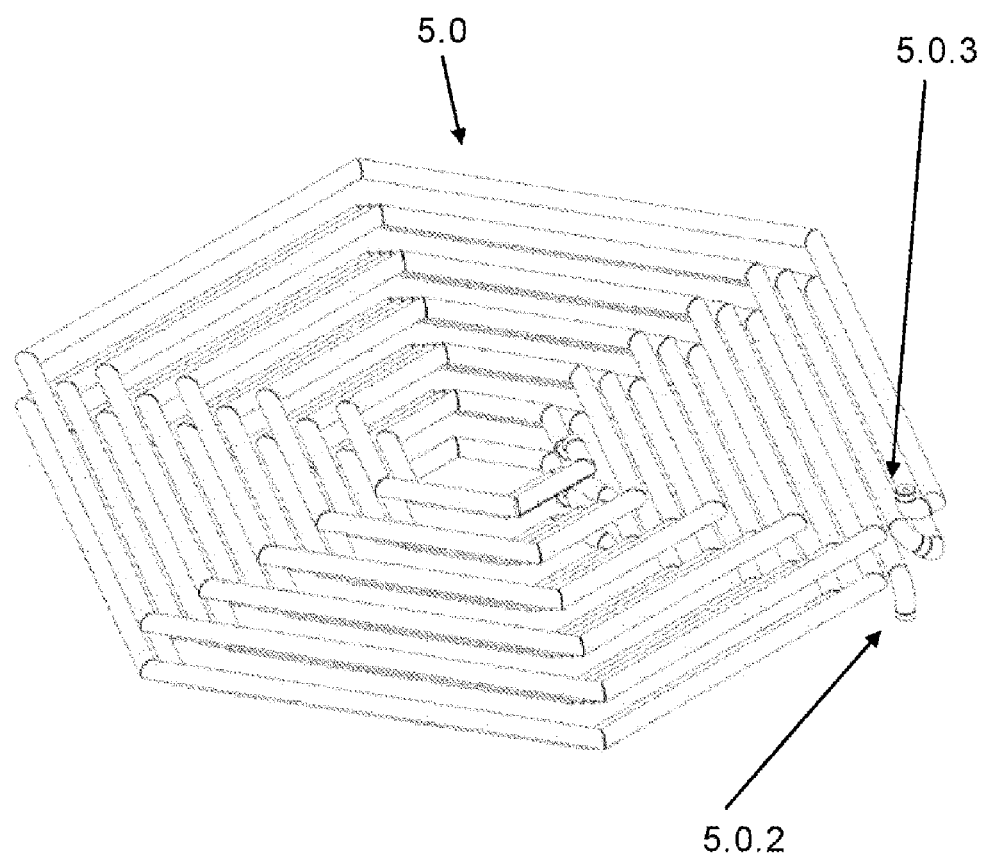
Figure 3:
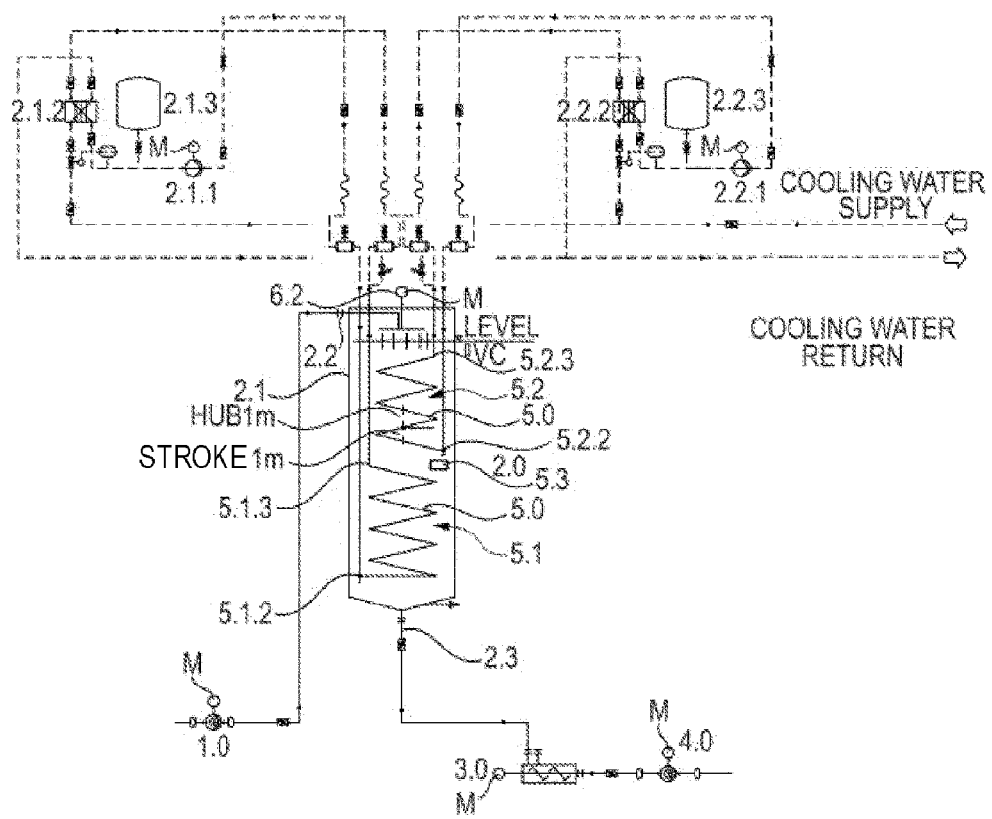
Figure 4A:
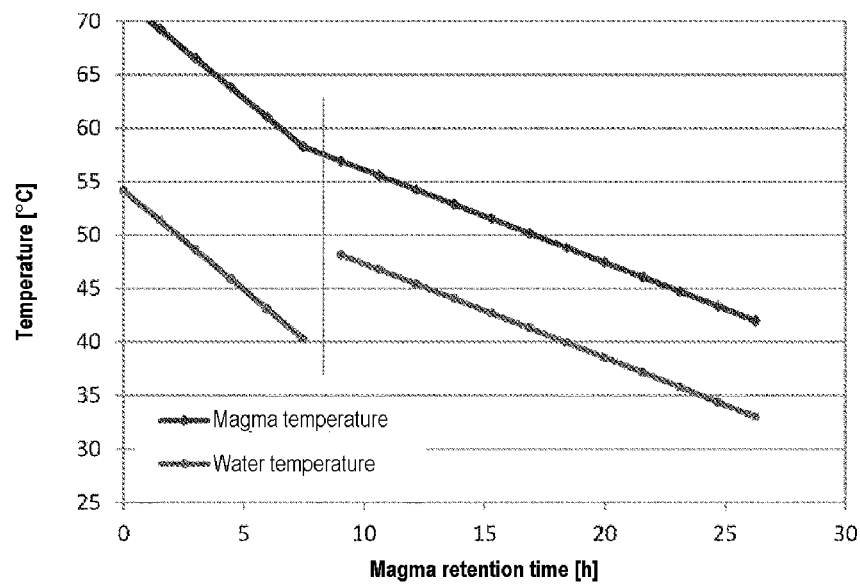
Figure 5A:
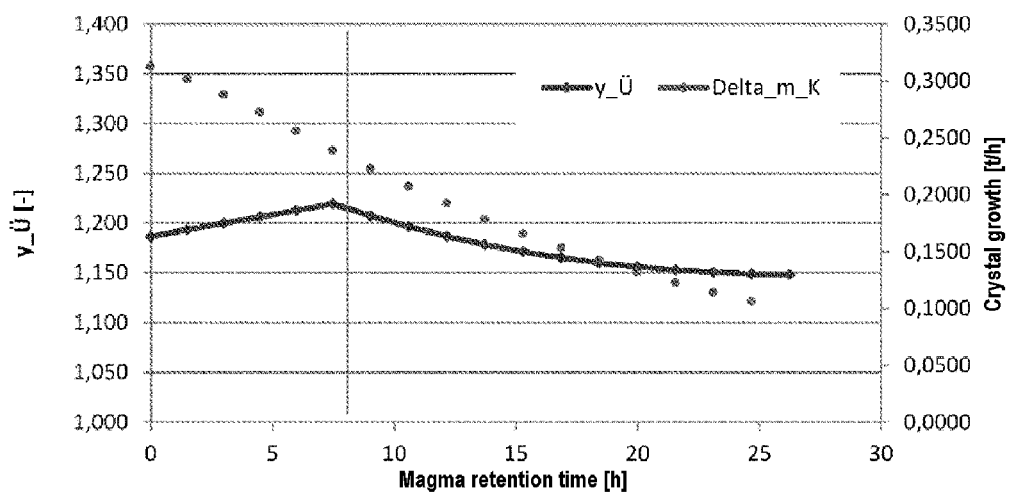
Figure 4B:
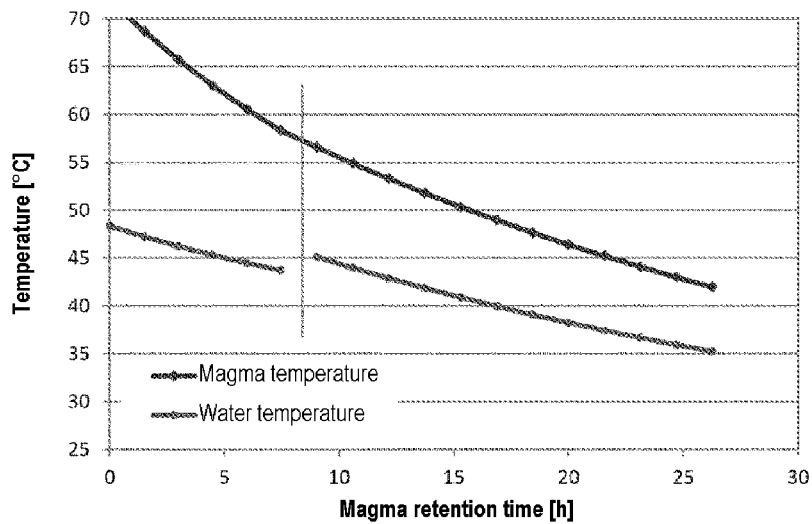
Figure 5B:
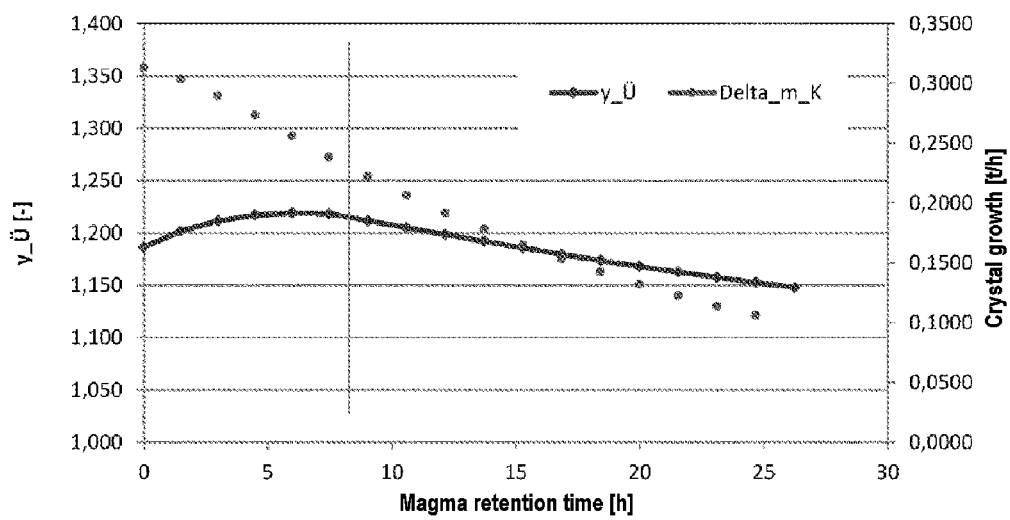

Exemplary embodiments of the invention will be explained in greater detail hereinbelow with reference to the accompanying figures, in which:

FIG. 1—shows a schematic representation of a cooling crystallizer in a partial section view;

FIG. 2—shows a schematic representation of a cooling block;

FIG. 3—shows a circuit diagram of a cooling crystallizer;

FIG. 4a—shows the temperature profile with constant temperature differences over the retention time of the magma in the cooling crystallizer;

FIG. 4b—shows the temperature profile with varying temperature differences over the retention time of the magma in the cooling crystallizer;

FIG. 5a—shows the supersaturation and the crystal growth with constant temperature differences over the retention time of the magma in the cooling crystallizer; and FIG. 5b—shows the supersaturation and the crystal growth with varying temperature differences over the retention time of the magma in the cooling crystallizer.

FIG. 1 shows in a schematic sectional view a cooling crystallizer 2.0 which has a vertically oriented container 2.1, which has an inlet 2.2 at the top and an outlet 2.3 at the bottom. Magma from the preliminary stages of the sugar crystallization is introduced into the container 2.1 through the inlet 2.2. The preliminary stages are, for example, the first crystal seed formation, white sugar production, raw sugar production and low-grade sugar production. The low-grade sugar is prepared, for example, in an evaporative crystallization tower, in which the purity of the mother liquor is reduced and a major portion of the low-grade sugar crystal mass is produced. Following this, the magma is cooled in the cooling crystallizer 2.0. The aim is to remove as much sucrose as possible from the mother liquor by increasing the size of the crystals that are already present. This is the last stage of desugarization of the mother liquor, which can be carried out continuously with the cooling crystallizer 2.0. The container 2.1 is filled completely with magma from the evaporative crystallization tower solely via the inlet 2.2. A distributor is driven via a motor 6.2 and rotates and distributes the magma from the inlet 2.2 uniformly over the entire surface of the magma inside the container 2.1. Cooling blocks 5.0, which are distributed in levels and vertically spaced apart one above the other, are arranged inside the container 2.1, which can have an operating volume of several hundred cubic meters, in order to cool the warm magma from the evaporative crystallization tower. Cooling water is pumped through the cooling blocks 5.0, which are preferably arranged at equal distances from one another, via a water inlet 2.4, wherein the cooling water as the heat transfer fluid is guided countercurrently to the flow of the magma through the cooling crystallizer 2.0, that is to say from bottom to top. The cold cooling water is thus pumped first through the lowermost cooling block 5.0 and, from there, upwards through the individual cooling blocks 5.0 to the water outlet 2.5 at the top. From there, the warmed heat transfer fluid or cooling water is processed, in particular cooled.

The entire cooling system with the cooling blocks 5.0 and the cooling water lines, which are in the form of pipes, oscillates in the vertical direction. The movement is carried out via drives 6.1, preferably in the form of hydraulic cylinders. The hydraulic cylinders 6.1 are arranged, preferably symmetrically, on the cover of the cooling crystallizer 2.0. By lifting and lowering the cooling blocks 5.0, the structure of which will be explained hereinbelow, a good self-cleaning effect is obtained, in order to avoid possible encrustations at the cooling surfaces. Highly viscous magmas can thus also be processed without problems. The vertical positioning of the container 2.1 results in a small floor space requirement; moreover, a modular configuration of the container 2.1 allows the systems to be adapted easily to different flow rates. Owing to the uniform relative movement of the magma relative to the cooling blocks, uniform and good heat transfer between the magma and the cooling medium or heat transfer fluid, in particular cooling water, is obtained. The outlet temperature at the outlet 2.3 at the bottom can be adjusted very precisely; the usual inlet temperature is between 60° C. and 85° C., depending on the preliminary process; the outlet temperature will usually be in the region of approximately 40° C.

FIG. 2 shows by way of example a cooling block 5.0, which is composed of straight pipe sections. The pipes are arranged hexagonally and are arranged guided in a spiral shape in two or more vertical levels. The pipes themselves are arranged in a substantially round frame, not shown, and fastened to supports which project radially outwards and can be lifted or lowered vertically via lifting devices, not shown. The cooling water or heat transfer fluid is fed in at a cooling block inlet 5.0.2 at the bottom. In the exemplary embodiment shown, the cooling block inlet 5.0.2 is arranged at an outer pipe, from where the cooling 20 liquid is pumped spirally inwards through the pipes and guided at a passage on the inside into the next cooling pipe level arranged vertically above, in which the cooling water is pumped through the pipes from the inside to the outside. The heat transfer fluid or cooling water is then guided from the cooling block outlet 5.0.3 at the top into a cooling block 5.0 arranged above.

FIG. 3 shows, in a circuit diagram, a cooling crystallizer 2.0 with the main components. Magma to be cooled is pumped via a magma pump 1.0 from the evaporative crystallizer to the magma inlet 2.2 at the top. The magma to be cooled is distributed uniformly over the surface of the magma already inside the container 2.1 via a distributor, not shown in greater detail, which is driven by the motor 6.2. A fill level sensor can be coupled with a controller, not shown, in order to ensure a uniform fill level of the container 2.1. The feed via the magma pump 1.0 corresponds to the discharge of the finished crystallized and cooled magma through the outlet 2.3 at the bottom end of the container 2.1. From the outlet 2.3, the cooled magma is fed to further processing, for example to a corresponding centrifuge device. This takes place via a magma pump 4.0, which can be arranged upstream of a molasses-magma mixer 3.0.

A plurality of cooling blocks 5.0 are arranged inside the container 2.1. In the diagram of FIG. 3, these are shown as a zig-zag line; they have in particular a form as has been described in FIG. 2. Different shapes, for example a true spiral shape or a different number of edges in the case of a polygonal structure, are likewise possible, as are variations in terms of the pipe levels per cooling block 5.0. The cooling blocks 5.0 in the exemplary embodiment of FIG. 3 are combined to form two cooling packs 5.1, 5.2. The first cooling pack 5.1 is arranged beneath the second cooling pack 5.2. The terms "above" and "beneath" each relate to a vertical orientation or the direction of gravity. Each cooling pack 5.1, 5.2 has its own cooling water inlet 5.1.2, 5.2.2 and its own cooling water outlet 5.1.3, 5.2.3, from which the cooling water or heat transfer fluid is discharged from the container 2.1. The cooling water outlet 5.1.3 of the first cooling pack 5.1 is located beneath or at the same height as the cooling water inlet 5.2.2 of the cooling pack located above, in the exemplary embodiment shown of the second cooling pack 5.2. In addition to the embodiment shown with two cooling packs 5.1, 5.2, it is also possible for three or more cooling packs to be arranged inside the container 2.1. Each cooling pack 5.1, 5.2 is supplied with cooling water via its own cooling water pump 2.1.1, 2.2.1. Valves in the feed lines regulate the amount of cooling water fed in. From the respective cooling water outlet 5.1.3, 5.2.3, the warmed cooling water is fed to its own heat exchanger 2.1.2, 2.2.2. A separate pressure equalization container 2.1.3, 2.2.3, from which cooling water is removed, is likewise associated with each cooling circuit. Each cooling pack 5.1, 5.2 thus has an independent cooling circuit with its own cooling water pump 2.1.1, 2.2.1, its own heat exchanger 2.1.2, 2.2.2 and its own pressure equalization container 2.1.3, 2.2.3, so that the two cooling packs 5.1, 5.2 are thermally and hydraulically separate from one another. The two cooling packs 5.1, 5.2 can jointly be lifted and optionally lowered via the hydraulic cylinders 6.1, not shown. Lowering can also take place via gravity. Lowering of the cooling packs 5.1, 5.2 within the magma takes place more quickly than the rate of descent of the magma within the container. The speed of descent of the magma within the container 2.1 is determined via a valve, not described in greater detail, or a control slide at the outlet 2.3 or by the pump 4.0. In principle, it is also possible that the individual cooling packs 5.1, 5.2 perform a lifting movement or lowering movement independently of one another, but it is advantageous in terms of the process if magmas at different temperatures are mixed as little as possible in order that the crystallization process is not disrupted and the formation of new, undesirable crystals is avoided. The formation of new, undesirable crystals is preferably detected by one or more optical sensors, which are arranged at a suitable location in the container 2.1 and/or in adjoining pipelines. Such sensors are suitable for carrying out a corresponding regulation for optimized operation without the formation of new crystals. New crystals that have undesirably formed in the crystallizer can be detected by means of an optical sensor and dissolved again in a regulating circuit in a downstream mixer, such as the molasses-magma mixer 3.0, by the addition of hot medium, such as, for example, hot molasses.

Between the two cooling packs 5.1, 5.2 there is arranged a temperature sensor 5.3, which measures the transition temperature of the magma between the two cooling packs 5.1, 5.2. The temperature sensor 5.3 is coupled with a control device, not shown, which is likewise coupled with the pumps 2.1.1, 2.2.1. The temperature of the cooling liquid or of the heat transfer medium is also monitored in order to be able to take account of and optionally change the supply temperature of the heat transfer fluid. By changing the supply temperature and/or by changing the amount of heat transfer fluid or cooling water, it is possible to adjust different temperature differences between the magma inside the container 2.1 and the cooling packs 5.1, 5.2 or the cooling water. As a result of the vertically separate arrangement of the cooling packs 5.1, 5.2, it is possible to adjust the temperature differences in dependence on the temperature of the magma. The velocity of crystallization of the magma changes with the degree of purity and the temperature of the magma. If cooling water from only one cooling circuit is pumped countercurrently through the cooling blocks 5.0 over the entire height of the cooling crystallizer 2.0, the temperature difference can be adjusted only at the lower cooling liquid inlet 5.1.2, 5.2.2. The temperature difference between the cooling packs 5.1, 5.2 and the magma in the container 2.1 can be influenced by changing the flow rates of the heat transfer fluids. The amount of heat transfer fluid cannot be increased arbitrarily, however, since the pressure loss in the line of the heat transfer fluid increases in relation to the speed of the heat transfer fluid in the pipes of the cooling blocks 5.0, so that a technical limit of about 10 bar cannot be exceeded. This problem can be avoided with the hydraulically and thermally decoupled cooling packs 5.1, 5.2, which are arranged vertically separately, since the pressure loss is approximately halved in the case of two hydraulically separate cooling circuits of equal size. Furthermore, it is possible with the two or further cooling packs to achieve optimal process conditions at all times. Surprisingly, it has been found that, with the above-described concept for the containers with a size of up to several 100 m³ and the unknown flow behavior of the magma in the very tall and slender containers 2.1, the cooling power can be intensified with an accompanying reduction in the number of cooling blocks compared with the prior art. Associated therewith, the overall size of the container 2.1 can be reduced. Alternatively, the flow rate of the magma can be increased while the overall size of the cooling crystallizer remains the same. It is likewise possible to construct cooling crystallizers in a modular manner and to adapt the cooling conditions to the retention times in the container, wherein the pressure loss in the line of the heat transfer fluid is only a secondary criterion.

FIG. 4a shows schematically the temperature profile over the retention time of the magma in a two-stage cooling crystallizer with constant temperature differences. The temperature of the magma is shown in the top curve, and the temperature of the cooling water as the heat transfer fluid is shown by means of the bottom two straight lines. The magma inlet temperature is approximately from 75° C. to 80° C. Over a mean retention time of approximately 27 hours, the magma is cooled to about 42° C. The retention time is the mean residence time of the magma or the crystal suspension in the cooling crystallizer; the temperature is measured at the location where the magma or the crystal suspension has the corresponding mean residence time. The outlet temperature of the cooling water as the heat transfer fluid from the lower cooling pack 5.1 is approximately 48° C., and the outlet temperature of the second, upper cooling pack 5.2 is approximately 55° C. The inlet temperature of the heat transfer fluid of the upper cooling pack 5.2 is 40° C., and the inlet temperature of the heat transfer fluid of the lower, first cooling pack 5.1 is 34° C. Owing to the countercurrent flow, the magma temperature falls and the temperature of the heat transfer fluid rises as they flow through the container 2.1. It will be seen from FIG. 4a that the temperature difference between the magma and the heat transfer fluid is different for the two cooling packs 5.1, 5.2. For the lower cooling pack 5.1, the temperature difference is about 8 K and is substantially constant over the entire contact length or contact time of the magma with the lower cooling pack 5.1. The temperature difference between the magma temperature and the temperature of the heat transfer fluid of the upper, second cooling pack 5.2 is about 18 K but can also be adjusted otherwise, for example at from 12 K to 15 K. Here too, the temperature difference is constant over the entire retention time or contact distance.

In FIG. 5a, the solid line shows the supersaturation $Y_0$ of the magma and the dotted line shows the crystal growth $\Delta mK$ over the retention time of the magma with constant temperature differences. For the cooling and crystallization in the upper region of the cooling crystallizer 2.0, the supersaturation increases linearly from about 1.18 to about 1.22. The supersaturation is a dimensionless concentration difference and is defined as the concentration of the dissolved substance to be crystallized in the liquid phase of the crystal suspension relative to the equilibrium concentration. The crystal growth is the amount of the crystallizing component that has grown from the liquid phase onto the existing crystallizate. The crystal growth is plotted over the height unit of the crystallizer; in the present case, a height unit is the distance between two cooling blocks with the associated magma volume. The supersaturation decreases continuously after approximately eight hours or at the transition between the upper cooling pack 5.2 and the lower cooling pack 5.1 and eventually falls to a value of 1.149. This is the result of the increasing crystallization, so that the crystal suspension has an increasingly lower sucrose content as the cooling and retention time increase. The crystal growth $\Delta mK$ is initially approximately 0.31 in the upper cooling pack 5.2 and falls as the retention time increases after contact with the lower, first cooling pack 5.1 to a value of 0.11; the crystal growth thus slows down.

In FIG. 4b, the temperature profile in a two-stage cooling crystallizer with varying temperature differences is shown schematically over the retention time of the magma. The temperature of the magma is shown in the top curve, and the temperature of the cooling water as the heat transfer fluid is shown by means of the bottom two curves. The magma inlet temperature is approximately from 75° C. to 80° C. Over a mean retention time of approximately 27 hours, the magma is cooled to about 42° C. The outlet temperature of the cooling water as the heat transfer fluid from the lower cooling pack 5.1 is approximately 45° C., and the outlet temperature of the second, upper cooling pack 5.2 is approximately 48° C. The inlet temperature of the heat transfer fluid of the upper cooling pack 5.2 is 44° C., and the inlet temperature of the heat transfer fluid of the lower, first cooling pack 5.1 is 35° C. It will be seen from FIG. 4b that the temperature difference between the magma and the heat transfer fluid is different for the two cooling packs 5.1, 5.2 and changes during the retention time. For the lower cooling pack 5.1, the temperature difference is between about 7 K at the inlet 5.1.2 and about 11 K at the outlet 5.1.3. The temperature difference between the magma temperature and the temperature of the upper, second cooling pack 5.2 is between about 15 K at the inlet 5.2.2 and about 24 K at the outlet 5.2.3.

In FIG. 5b, the solid line shows the supersaturation $Y_0$ of the magma and the dotted line shows the crystal growth $\Delta mK$ over the retention time of the magma with varying temperature differences. For the cooling and crystallization in the upper region of the cooling crystallizer 2.0, the supersaturation increases degressively from about 1.18 to about 1.22. The supersaturation decreases continuously after approximately eight hours or at the transition between the upper cooling pack 5.2 and the lower cooling pack 5.1 and eventually falls to a value of 1.148. The crystal growth $\Delta mK$ is approximately 0.31 in the upper cooling pack 5.2 and falls to a value of 0.11 as the retention time increases after contact with the lower, first cooling pack 5.1; the crystal growth thus slows down.

The invention claimed is:

1. A cooling crystallizer for sucrose magma in a vertically oriented container which has an inlet at a top of the vertically oriented container for feeding in the sucrose magma and an outlet at a bottom of the vertically oriented container for discharging the sucrose magma, comprising:
   a plurality of cooling packs which are positioned within the vertically oriented container and vertically spaced apart from one another, wherein
   each of the cooling packs of the plurality of cooling packs includes a flow inlet and a flow outlet, each being individual to the cooling pack, and the flow inlet is configured to receive a respective separate feed of a heat transfer fluid, individual to the cooling pack, each of the cooling packs is configured for the received separate feed of the heat transfer fluid to flow through the cooling pack and out from the cooling pack's flow outlet, as the cooling pack's respective discharged heat transfer fluid, and
   each of the cooling packs of the plurality of cooling packs comprises a respective plurality of cooling blocks that are vertically spaced apart from one another, wherein, for each of the cooling packs,
      each of the cooling blocks of the respective plurality of cooling blocks is configured for the heat transfer fluid to flow through the cooling block, and
      the plurality of cooling blocks are coupled to one another in an arrangement configured such that the flow of the heat transfer fluid through the cooling pack flows through each of the cooling blocks;
   a plurality of heat exchangers, which are positioned outside of the vertically oriented container and are respectively coupled to the plurality of cooling packs in an arrangement configured to provide, for each of the cooling packs, a separate, individual flow of the cooling pack's discharged heat transfer fluid to a corresponding one of the heat exchangers of the plurality of heat exchangers and wherein, in order to dissipate heat from the sucrose magma, each of the heat exchangers of the plurality of heat exchangers is configured to cool the flow of discharged heat transfer fluid the heat exchanger receives from the cooling pack to which the heat exchanger corresponds and output a respective separate flow of a cooled heat transfer fluid; and a plurality of pumps that are respectively coupled between the plurality of heat exchangers and the plurality of cooling packs in an arrangement that is configured to provide, for each of the cooling packs of the plurality of cooling packs, a separate, individual pumped flow to the flow inlet of the cooling pack, via a respective one of the pumps, of the cooled heat transfer fluid from a corresponding one of the heat exchangers, as the cooling pack's respective separate feed of the heat transfer fluid, wherein the plurality of cooling packs are arranged within the vertically oriented container in a configuration that provides, for the plurality of cooling packs, hydraulic separation from one another, and wherein the plurality cooling packs, the plurality of heat exchangers, and the plurality of pumps and their respective couplings are further arranged such that each of the cooling packs of the plurality of cooling packs is arranged in a separate cooling circuit among a plurality of separate cooling circuits, wherein each of the separate cooling circuits of the plurality of separate cooling circuits includes, in combination with a respective one of the cooling packs, a respective separate one of the heat exchangers of the plurality of heat exchangers and a respective separate one of the pumps of the plurality of pumps.

2. The cooling crystallizer as claimed in claim 1 wherein plurality of cooling packs are further arranged and configured such that a temperature difference between the sucrose magma and a respective cooling pack decreases from the top to the bottom of the vertically oriented container.

3. The cooling crystallizer as claimed in claim 1 further comprising means for individually adjusting a flow rate of the heat transfer fluid flowing through each of at two of the separate cooling circuits of the plurality of separate cooling circuits.

4. The cooling crystallizer as claimed in claim 1 further comprising means for separately adjusting an inlet temperature of the respective separate feed of the heat transfer fluid into a respective cooling pack of the plurality of cooling packs.

5. The cooling crystallizer as claimed in claim 1 further comprising a drive for vertically displacing one or more of the cooling blocks among the plurality of cooling packs.

6. The cooling crystallizer as claimed in claim 1 wherein at least some of the plurality of cooling packs are hydraulically separate from one another.

7. The cooling crystallizer as claimed in claim 1 further comprising a temperature sensor arranged in a region between two of the cooling packs of the plurality of cooling packs.

8. The cooling crystallizer as claimed in claim 1 further comprising at least one optical sensor arranged in the vertically oriented container, wherein the arrangement of the at least one optical sensor is configured to provide for detecting a formation of new crystals.

9. A method for sugar crystallization and cooling of sugar magma in a cooling crystallizer as claimed in claim 1 comprising adjusting a decreasing temperature difference between the plurality of cooling packs and the sucrose magma from the top to the bottom of the vertically oriented container, wherein a temperature difference of between 15 K and 20 K is set or adjusted in an uppermost cooling pack of the plurality of cooling packs and a temperature difference of between 8 K and 12 K is set or adjusted in a different cooling pack of the plurality of cooling packs wherein the different cooling pack is arranged vertically beneath the uppermost cooling pack.

10. The method as claimed in claim 9 further comprising adjusting for each of the cooling packs of the plurality of cooling packs different supersaturations of the sucrose magma.

11. The method as claimed in claim 9 further comprising guiding the heat transfer fluid counter currently through at least some of the cooling packs among the plurality of cooling packs.

12. The method as claimed in claim 9 further comprising maintaining constant temperature difference between the sucrose magma and the cooling blocks in a respective one of the cooling packs among the plurality of cooling packs.

13. The method as claimed in claim 9 further comprising steps:
(1) detecting formation of new crystals by at least one optical sensor in the vertically oriented container and/or in a pipeline; and
(2), wherein step (2) comprises removing the new crystals and/or changing operating parameters based on sensor data from the at least one optical sensor.

14. The method as claimed in claim 9 further comprising variably adjusting a temperature difference between the sucrose magma and the cooling blocks in a respective cooling pack of the plurality of cooling packs.

15. The cooling crystallizer as claimed in claim 1, wherein the pump to cooling pack coupling arrangement comprises a plurality of feed lines, wherein
each of the feed lines of the plurality of feed lines couples to the flow inlet of a corresponding one of the cooling packs of the plurality of cooling packs and to a corresponding one of the pumps of the plurality of pumps, and
each of the feed lines of the plurality of feed lines is configured to receive from outside the vertically oriented container, and to feed to the flow inlet of the corresponding one of the cooling packs as the cooling pack's respective separate feed of the heat transfer fluid, a respective one of a plurality of separate, individual flows of a cooled heat transfer fluid.

* * * * *